US011466755B2

(12) United States Patent
Moster et al.

(10) Patent No.: US 11,466,755 B2
(45) Date of Patent: Oct. 11, 2022

(54) CHAIN GUIDE AND TENSIONING APPARATUS FOR VEHICLES

(71) Applicant: BorgWarner Inc., Auburn Hills, MI (US)

(72) Inventors: Alan L. Moster, Clarkston, MI (US); Hiroyuki Fukuyama, Mie (JP); Timothy K. White, Sterling Heights, MI (US)

(73) Assignee: BorgWarner Inc., Auburn Hills, MI (US)

( * ) Notice: Subject to any disclaimer, the term of this patent is extended or adjusted under 35 U.S.C. 154(b) by 120 days.

(21) Appl. No.: 16/779,795

(22) Filed: Feb. 3, 2020

(65) Prior Publication Data
US 2021/0239193 A1 Aug. 5, 2021

(51) Int. Cl.
*F16H 7/08* (2006.01)
*F16H 7/18* (2006.01)

(52) U.S. Cl.
CPC ............. *F16H 7/08* (2013.01); *F16H 7/18* (2013.01); *F16H 2007/0872* (2013.01); *F16H 2007/0893* (2013.01); *F16H 2007/185* (2013.01)

(58) Field of Classification Search
CPC ..... F16H 7/00; F16H 7/06; F16H 7/08; F16H 2007/0863; F16H 2007/0872; F16H 7/18; F16H 2007/185; F16H 2007/0893
See application file for complete search history.

(56) References Cited

U.S. PATENT DOCUMENTS

| 5,045,032 A | * | 9/1991 | Suzuki | F16H 7/08 474/140 |
| 5,318,482 A | * | 6/1994 | Sato | F16H 7/08 474/111 |
| 5,647,811 A | | 7/1997 | Mott | |
| 5,720,682 A | | 2/1998 | Tada | |

(Continued)

FOREIGN PATENT DOCUMENTS

| DE | 3524378 A1 | 1/1987 |
| DE | 19609583 A1 | 9/1996 |

(Continued)

OTHER PUBLICATIONS

International Search Report dated Nov. 2, 2015.
(Continued)

*Primary Examiner* — Michael R Mansen
*Assistant Examiner* — Raveen J Dias
(74) *Attorney, Agent, or Firm* — Young Basile Hanlon & MacFarlane, P.C.

(57) ABSTRACT

A chain guide and tensioning apparatus is disclosed that is configured for engagement (contact) with a driven chain (e.g., in an automotive engine). The chain guide and tensioning apparatus includes a guide body and a guide face overlying the guide body. The guide face defines an inner surface and an opposite outer surface that is configured to guide and tension the driven chain. The guide face includes a plurality of spacers that extend therefrom into engagement (contact) with the guide body so as to define at least one channel that is configured to facilitate air and/or lubricant circulation between the guide body and the guide face to reduce heat and friction generated by engagement of the driven chain with the guide face.

20 Claims, 5 Drawing Sheets

(56) References Cited

U.S. PATENT DOCUMENTS

| | | | |
|---|---|---|---|
| 5,813,935 A | 9/1998 | Dembosky et al. | |
| 5,820,502 A * | 10/1998 | Schulze | F16H 7/08 474/140 |
| 6,036,613 A * | 3/2000 | Diehm | F01L 1/02 474/111 |
| 6,302,816 B1 * | 10/2001 | Wigsten | F16H 7/18 474/111 |
| 6,322,470 B1 | 11/2001 | Markley et al. | |
| 7,163,479 B2 | 1/2007 | Young | |
| 7,967,708 B2 | 6/2011 | Hayami et al. | |
| 8,747,263 B2 | 6/2014 | Konno et al. | |
| 8,992,358 B2 | 3/2015 | Adams | |
| 9,605,733 B2 | 3/2017 | Geibel et al. | |
| 9,856,942 B2 | 1/2018 | Rampp et al. | |
| 2002/0061799 A1 * | 5/2002 | Young | F16H 7/18 474/111 |
| 2005/0049095 A1 * | 3/2005 | Shum | F16H 7/18 474/140 |
| 2005/0107196 A1 * | 5/2005 | Konno | F16H 7/18 474/111 |
| 2005/0266946 A1 * | 12/2005 | Thomas | B29C 45/1635 474/111 |
| 2006/0040774 A1 * | 2/2006 | Hirayama | F16H 7/18 474/111 |
| 2006/0205548 A1 * | 9/2006 | Konno | F16H 7/18 474/111 |
| 2009/0036242 A1 * | 2/2009 | Hayami | F16H 7/18 474/111 |
| 2009/0075769 A1 * | 3/2009 | Shintani | F16H 7/18 474/140 |
| 2009/0239692 A1 | 9/2009 | Heinrich et al. | |
| 2009/0325748 A1 | 12/2009 | Pflug et al. | |
| 2011/0306449 A1 * | 12/2011 | Adams | B21D 26/033 474/111 |
| 2012/0015769 A1 * | 1/2012 | Adams | F16H 7/18 474/140 |
| 2012/0129636 A1 | 5/2012 | Lee et al. | |
| 2012/0295747 A1 | 11/2012 | Ishikawa et al. | |
| 2013/0053197 A1 | 2/2013 | Konno et al. | |
| 2013/0090201 A1 | 4/2013 | Mori et al. | |
| 2013/0210566 A1 | 8/2013 | Konno | |
| 2014/0057749 A1 | 2/2014 | Konno et al. | |
| 2014/0256487 A1 | 9/2014 | Ketterl et al. | |
| 2014/0349796 A1 | 11/2014 | Takagi et al. | |
| 2015/0204218 A1 * | 7/2015 | Utaki | F01L 1/46 474/140 |
| 2015/0204437 A1 | 7/2015 | Utaki | |
| 2015/0219190 A1 | 8/2015 | Geibel et al. | |
| 2017/0037956 A1 * | 2/2017 | Mishima | F16H 57/0456 |
| 2017/0248205 A1 | 8/2017 | Moster et al. | |
| 2020/0362944 A1 * | 11/2020 | Hashimoto | F16H 7/18 |

FOREIGN PATENT DOCUMENTS

| | | | | |
|---|---|---|---|---|
| DE | 102014014905 A1 | | 4/2016 | |
| DE | 112015003586 T5 | | 6/2017 | |
| DE | 102019127331 A1 | * | 4/2020 | F16H 7/18 |
| JP | H2-11830 A | | 1/1990 | |
| JP | H10292855 A | * | 11/1998 | F16H 2007/0872 |
| JP | 2000097042 A | | 4/2000 | |
| JP | 2001108031 A | | 4/2001 | |
| JP | 2001349400 A | | 12/2001 | |
| JP | 2003329092 A | | 11/2003 | |
| JP | 2007040331 A | | 2/2007 | |
| JP | 2013164134 A | | 8/2013 | |
| JP | 2013221609 A | | 10/2013 | |
| JP | 2017525915 A | | 9/2017 | |
| KR | 10-2012-0041893 A | | 5/2012 | |

OTHER PUBLICATIONS

Office Action Received for Japan Patent Application No. 2021-014030 dated Feb. 8, 2022.

Office Action Received for German Patent No. DE 10 2021 102 396.3 dated Oct. 28, 2021.

* cited by examiner

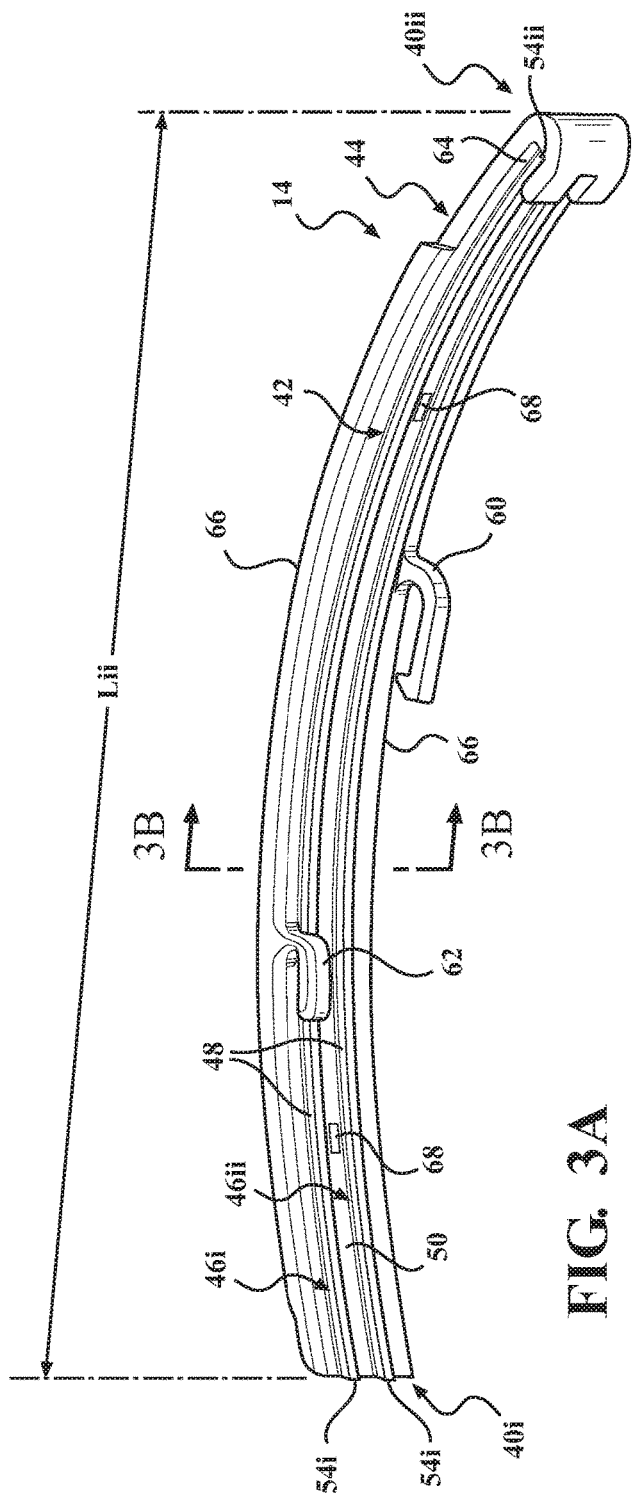
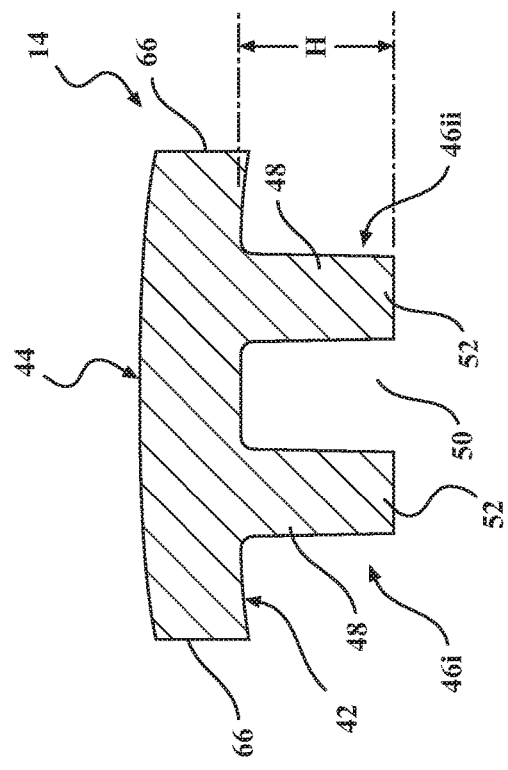
FIG. 3A
FIG. 3B

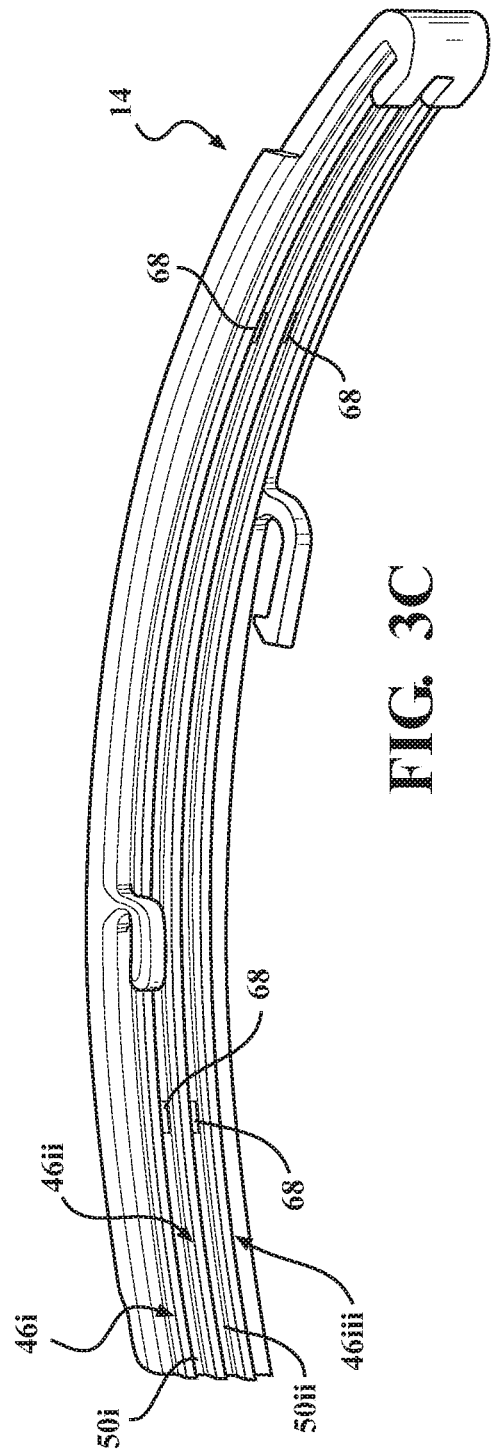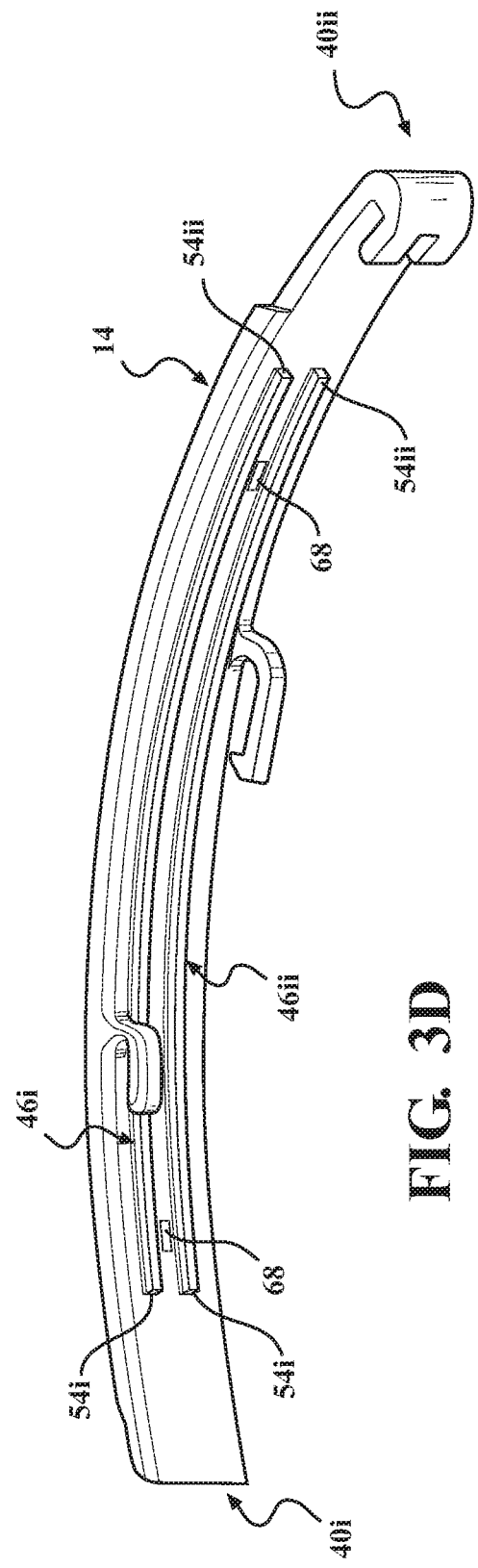

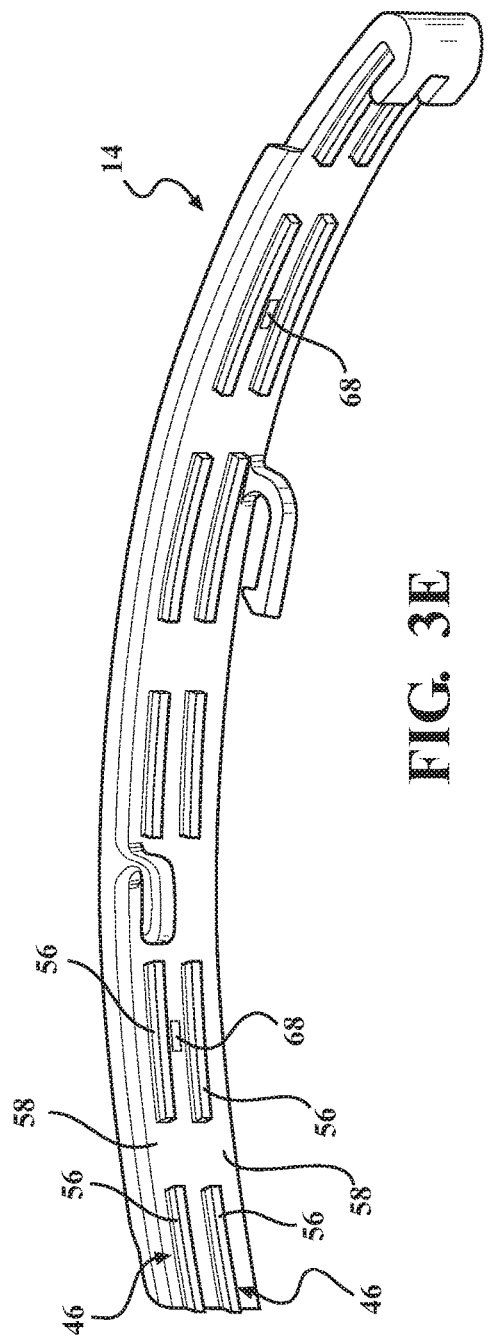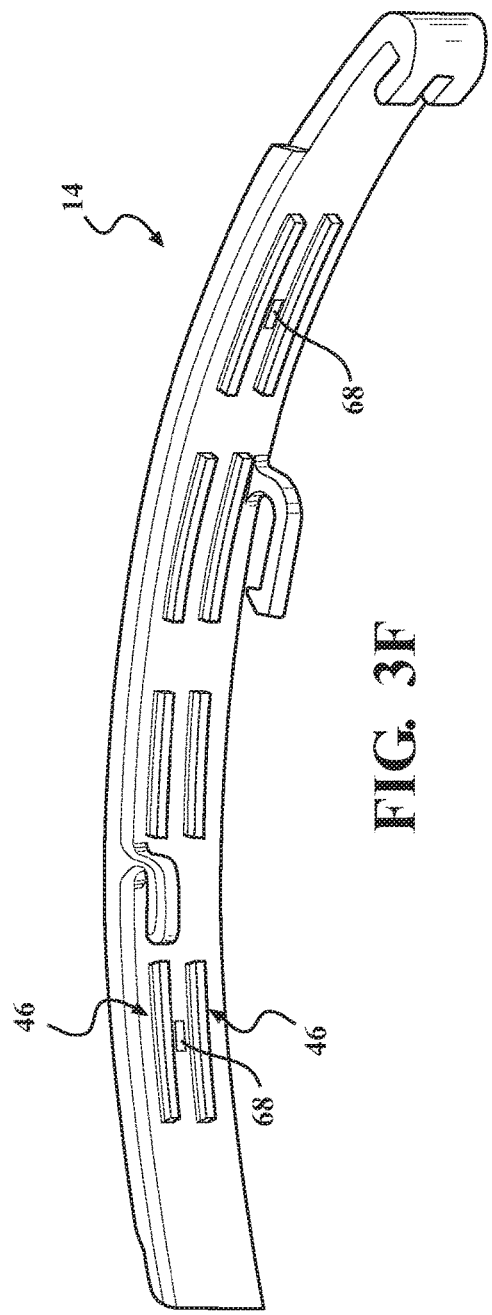

CHAIN GUIDE AND TENSIONING APPARATUS FOR VEHICLES

CROSS-REFERENCE TO RELATED APPLICATIONS

None.

FIELD OF THE INVENTION

The present disclosure relates to a chain guide and tensioning apparatus (e.g., for automotive engines), and, more particularly, to a chain guide and tensioning apparatus that is configured to reduce heat and friction generated by engagement with a driven chain of an engine.

BACKGROUND OF THE INVENTION

An automobile engine represents a complex interaction of mechanical parts with thermal and chemical reactions that produce the energy necessary to propel a vehicle. During the combustion cycle within an automotive engine, precise interactions occur between the engine's camshaft and the engine's crankshaft that determine when the combustion cycle takes place in each cylinder of the engine block. The crankshaft and camshaft work in tandem through a connection created by a driven (timing) chain.

The timing chain connects the engine's crankshaft and the engine's camshaft and transmits rotation energy from the crankshaft to the camshaft, which causes intake and exhaust valves within the engine to open and close. To transmit rotational energy, the timing chain engages gears that are mounted to ends of the crankshaft and the camshaft, the size of which creates a reduction of rotational speed that causes the camshaft and the crankshaft in accordance with a predetermined ratio (e.g., the camshaft may rotate at one-half the speed of the crankshaft).

The timing chain controls when the intake and exhaust valves open in relation to the position of the crankshaft by turning the camshaft at a particular rate. Exactly when the valves open and close is determined by the position of the camshaft in relation to the position of the crankshaft, the synchronicity of which is maintained by the timing chain.

Some timing chains are mounted in a fixed position on the crankshaft and camshaft gears and cannot be adjusted. As the timing chain wears, slack in the timing chain increases and alters the valve timing of the engine. These timing chains must be replaced when excessive slack appears. Other timing chains use tensioners that maintain a consistent amount of tension within the timing chain as the chain wears, reducing the effect that the slack in the timing chain has on the valve timing of the engine. Chain guides are mounted adjacent the timing chain to guide and provide tension to the timing chain by engaging the timing chain.

In order to maintain the appropriate tension in the timing chain, both manual and automatic chain guide and tensioners have been developed. In manual chain guide and tensioners, the chain guide is manually adjusted to provide the proper amount of tension in the timing chain. In automatic chain guide and tensioners, spring tension or hydraulic pressure may be utilized to properly tension the timing chains. Such chain guide and tensioners may employ an automatically adjustable chain guide that engages and guides the timing chain. For instance, a piston tensioner may pivotally adjust the chain guide through the use of a spring-loaded or hydraulically controlled piston. By pivoting the adjustable chain guide inward against the timing chain toward the inner loop of the timing chain, the tension on the timing chain can be increased thereby compensating for the slack created by the extended use of the timing chain.

The adjustable chain guide and tensioner includes a guide face that engages and guides the timing chain. The guide faces of the adjustable chain guide and tensioner have been previously fabricated from various metallic materials; however, such metallic materials can create an excessive amount of noise when engaging the timing chain and may create excessive wear on the timing chain. Other designs have utilized guide faces fabricated from various polymeric materials, such as plastic, in order to reduce the amount of noise and friction created when the guide face engages the timing chain. However, such polymeric materials may be susceptible to high levels of heat generated by the timing chain engaging the guide face, wherein such high levels of heat can lead to the melting of the guide face material. Previous designs have solved this problem by developing guide faces that are fabricated from high heat resistant materials so as to prevent the melting of the guide face material. However, such high heat resistant materials are expensive thereby increasing the price of manufacturing such a guide face. The above-noted problems associated with the previous designs of the guide face of an adjustable chain guide and tensioner are undesirable in an industrial environment.

A guide face that further reduces cost and noise as well as heat and/or friction generated by engagement with a timing chain would thus be desirable.

SUMMARY OF THE INVENTION

In one aspect of the present disclosure, a chain guide and tensioning apparatus is disclosed that is configured for engagement (contact) with a driven chain (e.g., in an automotive engine). The chain guide and tensioning apparatus includes a guide body and a guide face overlying the guide body. The guide face defines an inner surface and an opposite outer surface that is configured to guide and tension the driven chain. The guide face includes a plurality of spacers that extend therefrom into engagement (contact) with the guide body so as to define at least one channel that is configured to facilitate air and/or lubricant circulation between the guide body and the guide face to reduce heat and friction generated by engagement of the driven chain with the guide face.

In certain embodiments, the guide body may include at least one first aperture extending therethrough and the guide face may include at least one second aperture extending therethrough.

In certain embodiments, the at least one first aperture and the at least one second aperture may be configured as elongate openings.

In certain embodiments, the guide body and the guide face may be configured such that the at least one first aperture and the at least one second aperture are in communication with each other to allow lubricant to enter the at least one channel through the guide body to reduce heat and friction generated by engagement of the driven chain with the guide face.

In certain embodiments, the guide face may include a first spacer and a second spacer defining a first channel therebetween.

In certain embodiments, the guide face may further include a third spacer defining a second channel with the second spacer.

In certain embodiments, the guide face may include opposite first and second ends and may define a length extending therebetween.

In certain embodiments, each spacer may include a first end that is axially aligned with the first end of the guide face and an opposite second end that is axially aligned with the second end of the guide face such that the spacers span the length of the guide face in its entirety.

In certain embodiments, each spacer may include a first end that is spaced axially from the first end of the guide face and a second end that is spaced axially from the second end of the guide face such that the spacers span a portion of the length of the guide face.

In certain embodiments, each of the spacers may be continuous in configuration.

Alternatively, it is envisioned that each of the spacers may be discontinuous in configuration and may include a plurality of spacer segments that are spaced axially from each other so as to define a plurality of gaps therebetween.

In another aspect of the present disclosure, a chain guide and tensioning apparatus for a vehicle is disclosed that includes a guide body with at least one first aperture extending therethrough and a guide face that is received by the guide body. The guide face defines an outer surface that is configured for engagement (contact) with a driven chain of the vehicle and an opposite inner surface. The guide face includes a first spacer that extends from the inner surface into engagement (contact) with the guide body; a second spacer that extends from the inner surface into engagement with the guide body in generally parallel relation to the first spacer such that a channel is defined between the first spacer and the second spacer; and at least one second aperture that extends through the guide face in alignment with the channel. The channel is configured to facilitate air and/or lubricant circulation between the guide body and the guide face to reduce heat and friction generated by engagement of the driven chain with the guide face, and the at least one second aperture is in communication with the at least one first aperture extending through the guide body to allow lubricant to enter the channel through the guide body for communication through the at least one second aperture to the outer surface of the guide face to further reduce heat and friction generated by engagement of the driven chain with the guide face.

In certain embodiments, the guide face may include opposite first and second ends and may define a length extending therebetween.

In certain embodiments, each spacer may include a first end that is axially aligned with the first end of the guide face and an opposite second end that is axially aligned with the second end of the guide face such that each spacer spans the length of the guide face in its entirety.

In certain embodiments, each spacer may include a first end that is spaced axially from the first end of the guide face and a second end that is spaced axially from the second end of the guide face such that each spacer spans a portion of the length of the guide face.

In certain embodiments, each spacer may be discontinuous in configuration and may include a plurality of spacer segments that are spaced axially from each other so as to define a plurality of gaps therebetween.

In another aspect of the present disclosure, a method is disclosed for reducing heat and friction generated by engagement of a driven chain in a vehicle with a chain guide and tensioning apparatus including a first component and a second component received by the first component. The method includes communicating lubricant through at least one first aperture in the first component such that the lubricant is received within a channel defined between first and second spacers extending from the second component into engagement with the first component and communicating the lubricant through at least one second aperture in the second component to cool and lubricate the driven chain.

In certain embodiments, the method may further include circulating air between the first component and the second component.

In certain embodiments, circulating air between the first component and the second component may include circulating air through the channel defined between the first spacer and the second spacer.

BRIEF DESCRIPTIONS OF THE DRAWINGS

The description herein makes reference to the accompanying drawings, wherein like referenced numerals refer to like parts throughout several views, and wherein:

FIG. 3A is a perspective view of the guide face separated from the guide body illustrating a pair of spacers that separate the guide face from the guide body and define a channel therebetween;

FIG. 3B is a cross-sectional view of the guide face taken along line 3B-3B in FIG. 3A;

FIG. 3C is a perspective view of an alternate embodiment of the guide face seen in FIG. 3A including three spacers defining two channels therebetween;

FIG. 3D is a perspective view of an alternate embodiment of the guide face seen in FIG. 3A in which the spacers span only a portion of the length of the guide face;

FIG. 3E is a perspective view of an alternate embodiment of the guide face seen in FIG. 3A in which the spacers are discontinuous in configuration;

FIG. 3F is a perspective view of an alternate embodiment of the guide face seen in FIG. 3E in which the spacers span only a portion of the length of the guide face;

DETAILED DESCRIPTION

The present disclosure describes various embodiments and implementations of a chain guide and tensioning apparatus for engines (e.g., automotive engines). The chain guide and tensioning apparatus described herein include a guide body and a guide face that is supported by the guide body. The guide face defines an outer surface that is configured to engage (contact) a driven chain (or other such member) (e.g., a timing chain) of the engine and includes a plurality of spacers (e.g., ribs) that extend into engagement (contact) with the guide body so as to define one or more channels that extend between the guide body and the guide face. During operation, the channel(s) facilitate the circulation of air and/or lubricant between the guide body and the guide face to reduce the heat and/or friction generated by engagement of the driven chain with the guide face.

Figure 1:
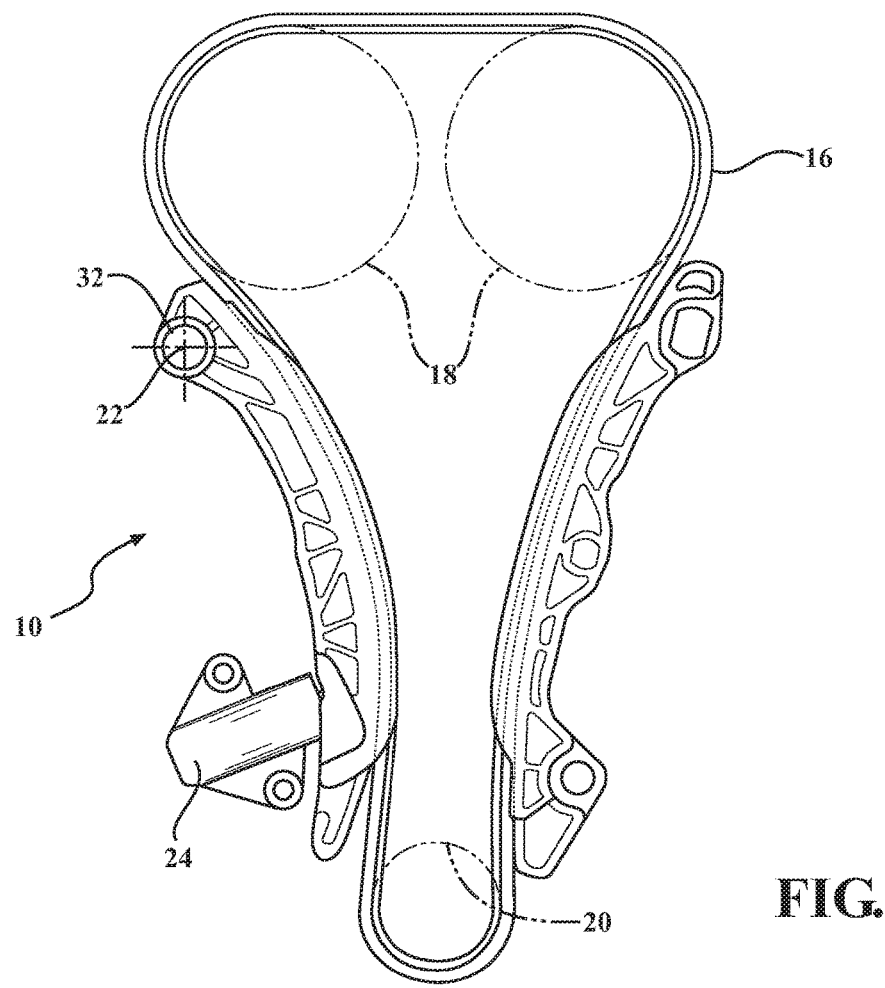
FIG. 1 is a front plan view of a chain guide and tensioning apparatus including a guide face and a guide body according to the principles of the present disclosure.
Figure 2:
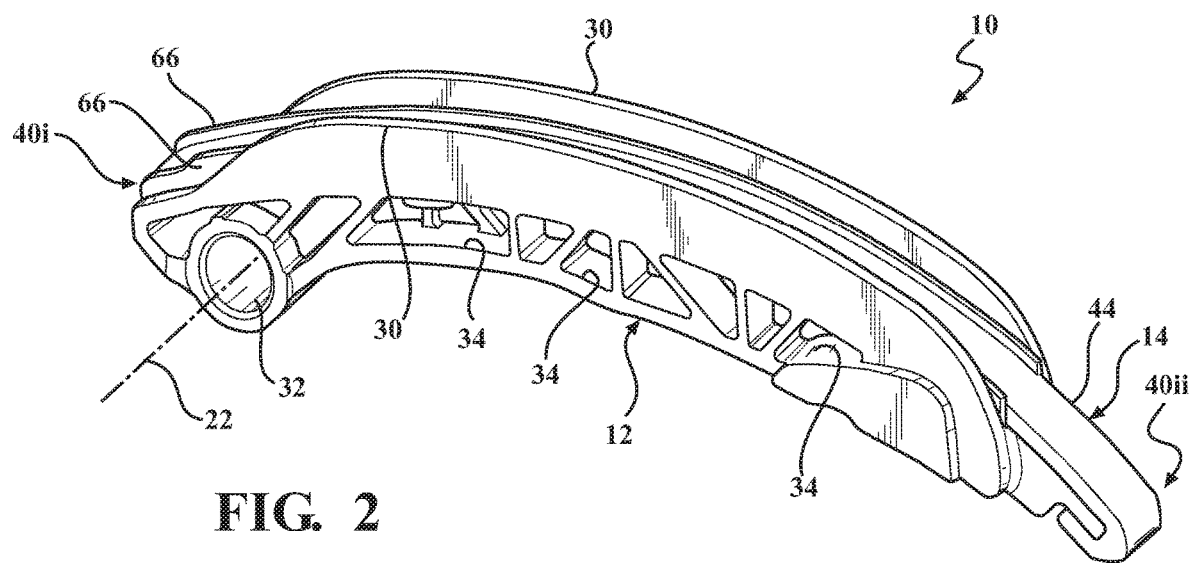
FIG. 2 is a perspective view of the chain guide and tensioning apparatus seen in FIG. 1.
Figure 4:
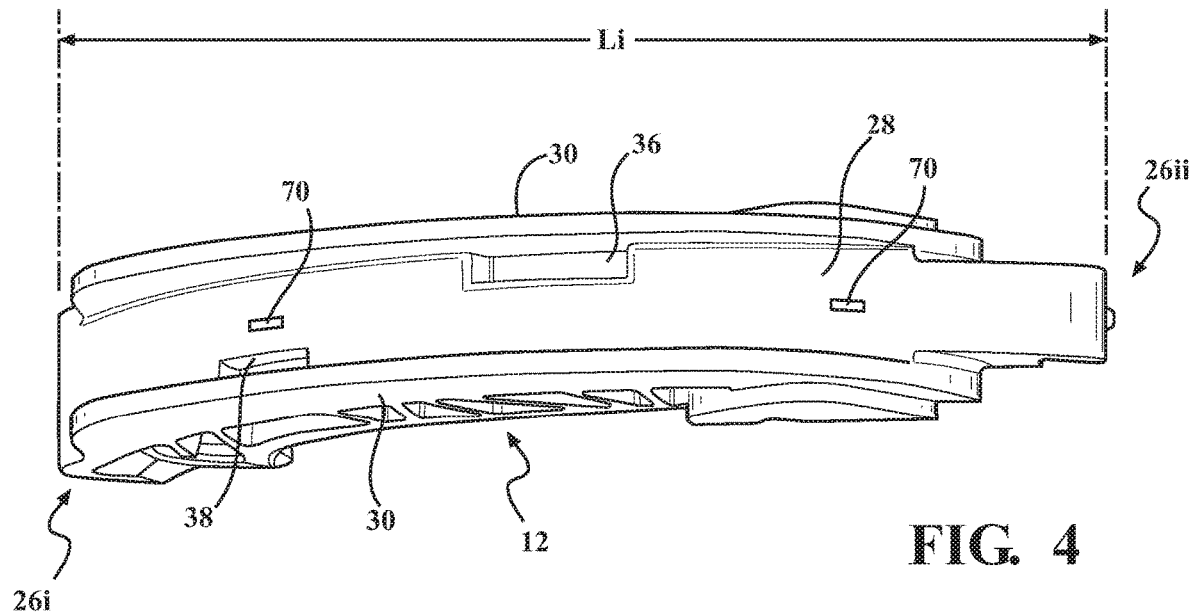
FIG. 4 is a perspective view of the guide body.
Figure 5:
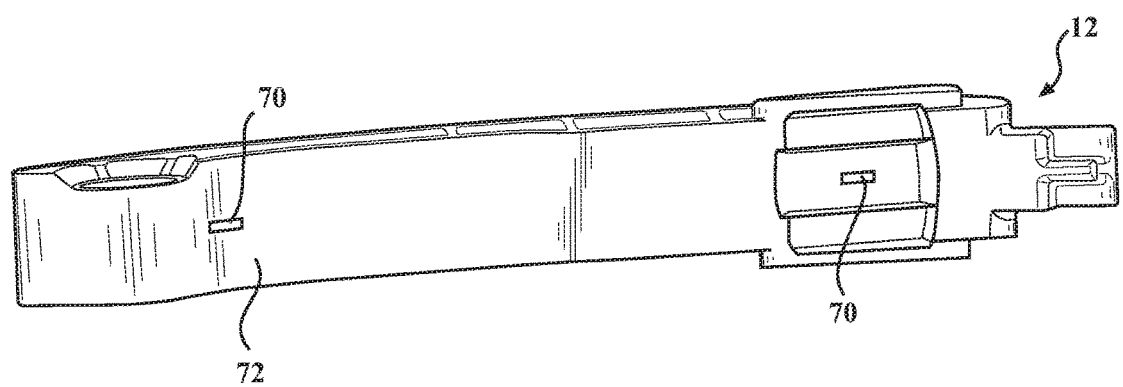
FIG. 5 is an opposing, perspective view of the guide body.

With reference to FIGS. 1 and 2, an apparatus 10 is illustrated that includes a guide body (first component) 12 and a guide face (second component) 14 that is releasably connected to (and received by) the guide body 12. The apparatus 10 is configured to guide and apply tension to a driven chain (member) 16 (e.g., the timing chain of an engine (not shown)), which may be utilized to synchronize the engine's camshafts and crankshaft. To facilitate such use, one or more gears (sprockets, or other such members) 18 are connected to the ends of the camshafts and one or more gears (sprockets, or other such members) 20 are connected to the crankshaft. More specifically, in the illustrated arrangement, the gear(s) 18 are positioned in generally adjacent relation to one another and the gear(s) 20 are positioned below the gear(s) 18. Although two gears 18 and a single gear 20 are illustrated, it should be appreciated that the particular number and/or orientation of the gears 18, 20 may be varied in alternate embodiments without departing from the scope of the present disclosure (e.g., depending upon the type of engine, intended utilization of the engine, etc.).

In certain embodiments, it is envisioned that the apparatus 10 may be pivotally mounted to a support structure (not shown), such as an engine block, between the gears 18, 20 such that the apparatus 10 is movable about a pivot axis 22. In such embodiment, a piston tensioner 24, which may be either manual or automatic, may be mounted adjacent to the apparatus 10 to displace (pivot) the apparatus 10 towards and away from the driven chain 16 to facilitate adjustments in the tension applied to the driven chain 16 and, thus, proper synchronization of the camshafts and the crankshaft. Although it is envisioned that the apparatus 10 may be utilized in automotive applications, it should be appreciated that the apparatus 10 is not limited to such use, and that the apparatus 10 may be utilized in connection with additional chain drive timing systems, balancer drives, oil pump drives, etc. Additionally, while the driven chain 16 is described herein as the timing chain of the vehicle, it should be appreciated that the particular configuration and/or intended use of the driven chain 16 may be varied in alternate embodiments without departing from the scope of the present disclosure. For example, embodiments in which the driven chain 16 may include a belt (or other such structure) are also contemplated herein.

With reference now to FIGS. 3A-5 as well, the guide body 12 and the guide face 14 will be described in additional detail. In certain embodiments, such as that shown throughout the figures, the guide body 12 may include a substantially arcuate (curvilinear) configuration. The guide body 12 defines an overall length Li (FIG. 4) extending between opposite ends 26i, 26ii thereof and defines an (outer) engagement surface 28 with a flat, curved configuration. The guide body 12 includes a pair of opposite guide walls 30 that extend outwardly from the engagement surface 28 in generally parallel relation to each other to thereby guide the driven chain 16 into place and into engagement (contact) with the guide face 14, as described in further detail below. The guide body 12 further includes an aperture 32 (FIG. 2) that extends transversely therethrough in generally orthogonal relation to the length Li of the guide body 12. The aperture 32 is configured to receive a pivot pin (not shown) to allow for pivotal movement of the guide body 12 about the pivot axis 22. It is envisioned that the guide body 12 may include (e.g., may be formed partially or entirely from) any suitable material or combination of materials, such as, for example, an aluminum or a glass-filled polymer. To reduce the overall weight of the guide body 12, in certain embodiments, cavities 34 (FIG. 2) may be created during manufacturing.

The guide body 12 further includes one or more apertures (e.g., slots) that extend through the guide engagement surface 28 to facilitate connection of the guide face 14 to the guide body 12, as described in further detail below. In the illustrated embodiment, for example, the guide body 12 includes a pair of apertures 36, 38 (FIG. 4) that are positioned on opposite sides of the guide body 12 and separated axially from one another along the length Li of the guide body 12. In the specific embodiment of the disclosure illustrated, the apertures 36, 38 differ in size from one another. Embodiments in which the apertures 36, 38 may be identical, however, would not be beyond the scope of the present disclosure.

The guide face 14 is received by the guide body 12 such that the guide face 14 overlays the engagement surface 28. To facilitate such positioning, in certain embodiments, such as that shown throughout the figures, the guide face 14 may include a substantially arcuate (curvilinear) configuration corresponding to that defined by the guide body 12. The guide face 14 defines an overall length Lii (FIG. 3A) extending between opposite ends 40i, 40ii thereof and defines opposite inner and outer surfaces 42, 44. A series of spacers 46 extend from the inner surface 42 of the guide face 14 towards the guide body 12. For example, in the illustrated embodiment, the spacers 46 are configured as ribs 48 that extend into engagement (contact) with the engagement surface 28 of the guide body 12. The spacers 46 define at least one channel 50 therebetween and separate the inner surface 42 of the guide face 14 from the engagement surface 28 of the guide body 12 to facilitate not only airflow between the guide face 14 and the guide body 12, but the circulation of lubricant (e.g., splash oil) therebetween to reduce heat and/or friction generated via engagement (contact) between the driven chain 16 and the guide face 14, as described in further detail below.

Each spacer 46 defines an end surface 52 (FIG. 3B) that is configured for engagement (contact) with the engagement surface 28 of the guide body 12. More specifically, the end surface 52 of each spacer 46 is generally planar in configuration so as to stabilize the guide face 14 relative to the guide body 12 and inhibit (if not entirely prevent) undesirable relative movement therebetween (e.g., shaking, rattling, wobbling, etc.).

In the illustrated embodiment, each of the spacers 46 defines a height H that lies substantially within the range of approximately 1 mm to approximately 5 mm (e.g., approximately 2 mm to approximately 3 mm). It should be appreciated, however, that the height H of the spacers 46 may be varied without departing from the scope of the present disclosure to increase or decrease the circulation of air and/or lubricant between the guide body 12 and the guide face 14 as necessary or desired (e.g., depending upon the particular materials used in construction of the guide body 12 and the guide face 14, the particular application of the engine, etc.).

Although the spacers 46 are shown as being generally linear in configuration and as extending in generally parallel relation to each other and the respective lengths Li, Lii of the guide body 12 and the guide face 14 in the illustrated embodiment, in alternate embodiments of the disclosure, it is envisioned that the configuration and/or the orientation of the spacers 46 may be varied. For example, embodiments in which the spacers 46 may be non-linear (e.g., arcuate or sinusoidal) in configuration would not be beyond the scope of the present disclosure. Additionally, while two spacers 46i, 46ii are shown as defining the single channel 50 therebetween, it should be appreciated that the particular number of spacers 46 and channels 50 may be varied in alternate embodiments without departing from the scope of the present disclosure. For example, FIG. 3C illustrates an embodiment of the disclosure in which the guide face 14 including three spacers 46i, 46ii, 46iii defining two channels 50i, 50ii therebetween. Additional embodiments including a greater number of spacers 46 and channels 50 (e.g., four spacers 46 defining three channels 50 therebetween) are also contemplated herein.

In the illustrated embodiment, the spacers 46 are illustrated as including opposite ends 54i, 54ii (FIG. 3A, 3D) that are axially aligned with (e.g., positioned generally adjacent to) the respective ends 40i, 40ii of the guide face 14, whereby the spacers 46 span the entire length Lii of the guide face 14. In alternate embodiments of the disclosure, however, it is envisioned that the spacers 46 may span only a portion of the length Lii of the guide face 14. For example, as seen in FIG. 3D, the ends 54i, 54ii of the spacers 46i, 46ii may be spaced axially inward from the respective ends 40i, 40ii of the guide face 14, respectively.

Additionally, although shown as being continuous in configuration, it is also envisioned that each of the spacers 46 may include a discontinuous (interrupted) configuration in alternate embodiments of the disclosure. For example, as seen in FIG. 3E, the spacers 46 may each include a series of discrete spacer segments 56 that are spaced axially from one another so as to define gaps 58 therebetween. It is envisioned that the gaps 58 between the spacer segments 56 may facilitate the transverse (e.g., orthogonal) communication of air and/or lubricant between the guide body 12 and the guide face 14 (e.g., at an angle to the respective lengths Li (FIG. 4), Lii (FIG. 3A) of the guide body 12 and the guide face 14). In such embodiments, it is contemplated that the spacers 46 may span the entire length Lii of the guide face 14, as seen in FIG. 3E, or that the spacers 46 may span only a portion of the length Lii of the guide face 14, as seen in FIG. 3F.

As seen in FIG. 3A, the guide face 14 further includes a pair of latching members 60, 62 (e.g., teeth, hooks, etc.) that are configured for insertion into the apertures 36, 38 (FIG. 4) in the guide body 12. Thus, in the illustrated embodiment, the guide face 14 includes the pair of latching members 60, 62 that are positioned on opposite sides of the guide face 14 and separated axially from one another along the length Lii of the guide face 14. The latching members 60, 62 are fixedly connected to the guide face 14 and, in the illustrated embodiment, are formed integrally therewith such that the latching members 60, 62 extend from the inner surface 42. In the specific embodiment of the disclosure illustrated, the latching members 60, 62 differ in size from one another in correspondence with the dimensioning of the apertures 36, 38 in the guide body 12. Embodiments in which the latching members 60, 62 may be identical, however, would not be beyond the scope of the present disclosure.

The end 40ii of the guide face 14 is provided with a generally U-shaped (hooked) configuration. More specifically, the end 40ii of the guide face 14 defines a receiving space 64 (FIG. 3A) that is configured to receive the end 26ii of the guide body 12 to facilitate connection of the guide body 12 and the guide face 14. To connect the guide face 14 to the guide body 12, the end 26ii of the guide body 12 is inserted into the receiving space 64 at the end 40ii of the guide face 14 and the latching members 60, 62 are inserted into the apertures 36, 38 formed in the guide body 12, respectively. The latching members 60, 62 engage a complementary member (not shown) within the apertures 36, 38 so as to removably secure the guide face 14 to the guide body 12.

The outer surface 44 of the guide face 14 is configured for engagement (contact) with the driven chain 16 to facilitate the application of tension thereto. More specifically, the outer surface 44 includes a flat, curved configuration that extends in substantially parallel relation to the engagement surface 28 of the guide body 12 and the inner surface 42 of the guide face 14. The guide face 14 further includes a pair of opposite side walls 66 that extend in generally parallel relation to each other and the length Lii of the guide face 14. In the illustrated embodiment, the side walls 66 are integrally connected to and extend outward from the outer surface 44 of the guide face 14 to assist in guiding the driven chain 16 into place. To reduce noise and friction generated via engagement (contact) between the outer surface 44 and the driven chain 16, the guide face 14 may include (e.g., may be formed partially or entirely from) a low-weight, high-strength material, such as, for example, a polymeric material, one or more plastics, etc.

The guide face 14 includes one or more apertures that extend therethrough. For example, in the illustrated embodiment, the guide face 14 includes a pair of apertures 68 (FIG. 3A), which extend through the guide face 14. The aperture(s) 68 in the guide face 14 communicate with one or more corresponding apertures 70 (FIGS. 4, 5) that extend through the guide body 12. More specifically, the apertures 68, 70 are positioned in alignment with each other and with the channel(s) 50 defined by the spacers 46 and provide conduits that extend through the guide face 14 and the guide body 12, respectively, to thereby facilitate the communication of lubricant through the guide body 12 to the outer surface 44 of the guide face 14 and, thus, to the driven chain 16. Embodiments in which the apertures 68, 70 are misaligned (e.g., embodiments in which the apertures 68, 70 are spaced transversely and/or axially from each other), however, are also contemplated herein. Although each of the apertures 68, 70 is shown as being configured as an elongated, generally rectangular opening (slot) in the illustrated embodiment, alternate configurations for the aperture(s) 68 and/or the aperture(s) 70 are contemplated herein and would also be within the scope of the present disclosure.

During use of the apparatus 10, lubricant is supplied to the aperture(s) 70 in the guide body 12 from a lubricant source such that lubricant enters the channels(s) 50 defined by the spacers 46 through the aperture(s) 70 and is ultimately communicated to the outer surface 44 of the guide face 14 through the aperture(s) 68 to thereby cool and lubricate the guide face 14 and the driven chain 16. In the illustrated embodiment, for example, lubricant is supplied by the piston tensioner 24, which is mounted adjacent to an inner surface (underside) 72 (FIG. 5) of the guide body 12 such that a piston (not shown) of the piston tensioner 24 is positioned adjacent to (e.g., in abutment with) one of the aperture(s) 70. The piston includes an aperture (not shown) formed in an end thereof, and the piston tensioner 24 is filled with lubricant by a lubricant pump (not shown) such that lubricant travels through the piston to the aperture(s) 70, into the channel(s) 50, and through the aperture(s) 68 to the outer surface 44 of the guide face 14, as previously described. It should be appreciated, however, that the present disclosure is not limited to applications in which lubricant is supplied by the piston tensioner 24 and that source of lubricant may be any suitable structure or mechanism of the engine, such as, for example, a mounting boss (not shown) that is configured to supplying lubricant to the apparatus 10, or means for redirecting lubricant from a cylinder head (not shown) of the engine.

While the guide body 12 and the guide face 14 are described herein as being discrete components of the apparatus 10, embodiments are also envisioned in which the guide body 12 and the guide face 14 may be integrally (e.g., monolithically) formed as a single integral body. In such embodiments, lubricant passageways may be formed that extend throughout the combined guide body 12 and guide face 14 to receive lubricant and cool the guide face 14. In addition, it is envisioned that cooling fins (not shown) may be included on the guide face 14, in any embodiment thereof, to allow lubricant splash cooling to occur between the guide face 14 and the guide body 12.

In operation, the apparatus 10 may be mounted to an engine, as shown in FIG. 1, so as to guide and provide tension to the driven chain 16. When so mounted, the piston tensioner 24 engages the guide body 12 to thereby pivot the apparatus 10 towards the driven chain 16 and facilitate the application of suitable tension to the driven chain 16. In the illustrated embodiment, the piston tensioner 24 also distributes and provides lubricant to the aperture(s) 70 in the guide body 12 such that lubricant is communicable through the aperture(s) 70 into the channel(s) 50 defined between the spacers 46 and to the outer surface 44 of the guide face 14 and the driven chain 16 via the aperture(s) 68 in the guide face 14. The lubricant not only provides suitable lubrication between the driven chain 16 and the outer surface 44 of the guide face 14, but reduces heat and/or friction generated via engagement (contact) between the driven chain 16 and the guide face 14, as discussed above, which may allow for the use of less expensive polymeric materials in construction of the guide face 14.

The lubricant provided by the piston tension 24 may be supplemented by a splashing effect during operation of the engine (e.g., lubricant that is indirectly communicated to the apparatus 10 from lubricant jets directed towards sprockets, the vehicle's lubricant pump and/or lubricant sump, etc.). The additional splash lubricant may be circulated or otherwise retained and/or distributed between the guide body 12 and the guide face 14 by the channel(s) 50 defined by the spacers 46 so as to further reduce the heat and/or friction generated via engagement (contact) between the driven chain 16 and the guide face 14. Heat dissipation may be further augmented via the circulation of ambient air between the guide body 12 and the guide face 14 through the channel(s) 50 defined by the spacers 46.

Persons skilled in the art will understand that the various embodiments of the disclosure described herein and shown in the accompanying figures constitute non-limiting examples, and that additional components and features may be added to any of the embodiments discussed herein without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms, such as "comprises," "includes," and "having," should be understood to provide support for narrower terms, such as "consisting of," "consisting essentially of," and "comprised substantially of." Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately" and "generally" should be understood to encompass variations on the order of 25%, or to allow for manufacturing tolerances and/or deviations in design.

Although terms such as "first," "second," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A chain guide and tensioning apparatus configured for engagement with a driven chain in a vehicle, the chain guide and tensioning apparatus comprising:
    a guide body having a flat engagement surface; and
    a guide face overlying the guide body, the guide face defining an inner surface and an opposite outer surface configured to guide and tension the driven chain, the guide face including a plurality of spacers extending therefrom into engagement with the flat engagement surface of the guide body so as to define at least one channel configured to facilitate air and/or lubricant circulation between the guide body and the guide face to reduce heat and friction generated by engagement of the driven chain with the guide face.

2. The chain guide and tensioning apparatus of claim 1, wherein the guide body includes at least one first aperture extending therethrough and the guide face includes at least one second aperture extending therethrough.

3. The chain guide and tensioning apparatus of claim 2, wherein the at least one first aperture and the at least one second aperture are configured as elongate openings.

4. The chain guide and tensioning apparatus of claim 2, wherein the guide body and the guide face are configured such that the at least one first aperture and the at least one second aperture are in communication with each other to allow lubricant to enter the at least one channel through the guide body to reduce heat and friction generated by engagement of the driven chain with the guide face.

5. The chain guide and tensioning apparatus of claim 1, wherein the plurality of spacers include a first spacer and a second spacer defining a first channel of the at least one channel therebetween.

6. The chain guide and tensioning apparatus of claim 5, wherein the plurality of spacers include a third spacer defining a second channel of the at least one channel with the second spacer.

7. The chain guide and tensioning apparatus of claim 5, wherein the guide face includes opposite first and second ends and defines a length extending therebetween, the first and second spacers including a first end axially aligned with the first end of the guide face and an opposite second end axially aligned with the second end of the guide face such that the first and second spacers spans the length of the guide face in its entirety.

8. The chain guide and tensioning apparatus of claim 7, wherein the first and second spacers are continuous in configuration.

9. The chain guide and tensioning apparatus of claim 7, wherein the first and second spacers are discontinuous in configuration and includes a plurality of spacer segments spaced axially from each other so as to define a plurality of gaps therebetween.

10. The chain guide and tensioning apparatus of claim 5, wherein the guide face includes opposite first and second ends and defines a length extending therebetween, the first and second spacers including a first end spaced axially from the first end of the guide face and a second end spaced axially from the second end of the guide face such that each spacer spans a portion of the length of the guide face.

11. The chain guide and tensioning apparatus of claim 10, wherein the first and second spacers are continuous in configuration.

12. The chain guide and tensioning apparatus of claim 10, wherein the first and second spacers are discontinuous in configuration and includes a plurality of spacer segments spaced axially from each other so as to define a plurality of gaps therebetween.

13. A chain guide and tensioning apparatus for a vehicle, the chain guide and tensioning apparatus comprising:
  a guide body having a flat engagement surface including at least one first aperture extending therethrough; and
  a guide face received by the guide body, the guide face defining an outer surface configured for engagement with a driven chain of the vehicle and an inner surface opposite to the outer surface, the guide face including:
    a first spacer extending from the inner surface into engagement with the flat engagement surface engagement surface of the guide body;
    a second spacer extending from the inner surface into engagement with the flat engagement surface engagement surface of the guide body in generally parallel relation to the first spacer, the first spacer and the second spacer defining a channel therebetween configured to facilitate air and/or lubricant circulation between the guide body and the guide face to reduce heat and friction generated by engagement of the driven chain with the guide face; and
  at least one second aperture extending through the guide face and being aligned with the channel, the at least one second aperture being in communication with the at least one first aperture extending through the guide body to allow lubricant to enter the channel through the guide body for communication through the at least one second aperture to the outer surface of the guide face to further reduce heat and friction generated by engagement of the driven chain with the guide face.

14. The chain guide and tensioning apparatus of claim 13, wherein the guide face includes opposite first and second ends and defines a length extending therebetween, each spacer including a first end axially aligned with the first end of the guide face and an opposite second end axially aligned with the second end of the guide face such that each spacer spans the length of the guide face in its entirety.

15. The chain guide and tensioning apparatus of claim 14, wherein each spacer is discontinuous in configuration and includes a plurality of spacer segments spaced axially from each other so as to define a plurality of gaps therebetween.

16. The chain guide and tensioning apparatus of claim 13, wherein the guide face includes opposite first and second ends and defines a length extending therebetween, each spacer including a first end spaced axially from the first end of the guide face and a second end spaced axially from the second end of the guide face such that each spacer spans a portion of the length of the guide face.

17. The chain guide and tensioning apparatus of claim 16, wherein each spacer is discontinuous in configuration and includes a plurality of spacer segments spaced axially from each other.

18. A method of reducing heat and friction generated by engagement of a driven chain in a vehicle with a chain guide and tensioning apparatus including a first component and a second component received by the first component, the method comprising:
  communicating lubricant through at least one first aperture in the first component such that the lubricant is received within a channel defined between first and second spacers extending from the second component into engagement with a flat engagement surface of the first component; and
  communicating the lubricant through at least one second aperture in the second component to cool and lubricate the driven chain.

19. The method of claim 18, further comprising circulating air between the first component and the second component.

20. The method of claim 19, wherein circulating air between the first component and the second component includes circulating air through the channel defined between the first spacer and the second spacer.

* * * * *